Nov. 6, 1956  J. C. WAGNER  2,769,503
PIVOTALLY MOUNTED FENDER FOR CAB-OVER-ENGINE VEHICLES
Filed Oct. 9, 1952  2 Sheets-Sheet 1

INVENTOR.
John C. Wagner
BY Paul O. Pippel
Att'y

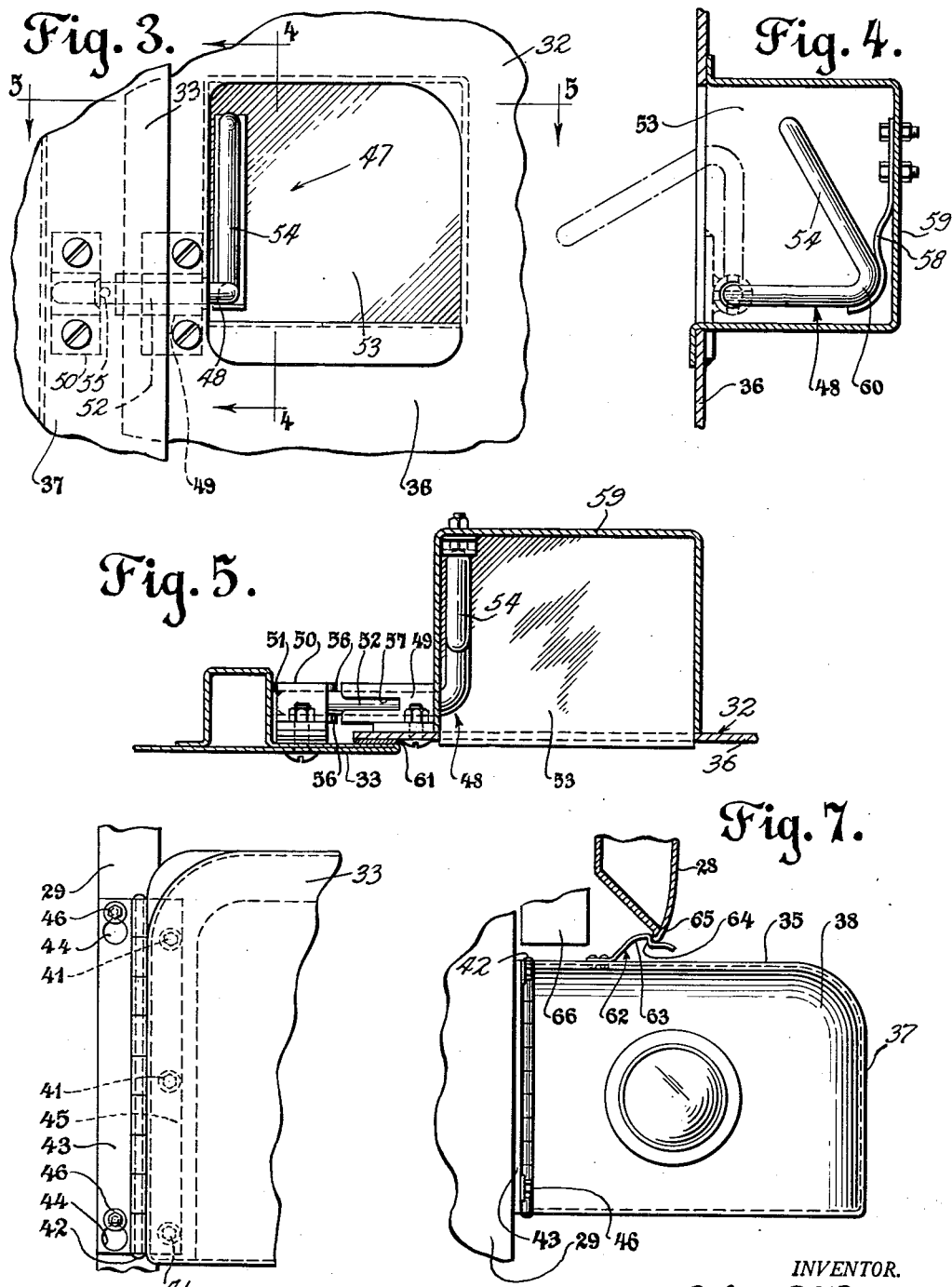
Nov. 6, 1956 — J. C. WAGNER — 2,769,503
PIVOTALLY MOUNTED FENDER FOR CAB-OVER-ENGINE VEHICLES
Filed Oct. 9, 1952
INVENTOR.
John C. Wagner
BY Paul O. Pippel
Atty United States Patent Office 2,769,503
Patented Nov. 6, 1956

2,769,503

PIVOTALLY MOUNTED FENDER FOR CAB-OVER-ENGINE VEHICLES

John C. Wagner, Berkeley, Calif., assignor to International Harvester Company, a corporation of New Jersey Application October 9, 1952, Serial No. 313,831

6 Claims. (Cl. 180—89)

This invention relates to vehicle fender construction and more particularly to sectional fender construction for a cab-over-engine type motor truck.

The present invention contemplates the provision of a vehicle fender which is disposed below the vehicle body of a cab-over-engine type motor truck and extends substantially the full length of the engine mounted beneath the body to serve as one wall of an enclosure for the engine. The fender includes a stationary section which is secured to the chassis frame and a movable section which is normally disposed in alignment with the stationary section but is capable of being swung open away from the stationary section or be entirely removed to gain access to the side of the engine enclosed thereby.

Another object is the provision of a novel quick releasable lock device for connecting the movable fender section to the stationary section which secures the fender sections in snug, close-fitting engagement with each other and thus mitigates the possibility of the sections rattling or squeaking.

A further object is the provision of a safety interlock mechanism for a sectional fender which positively locks the movable fender section in its aligned position with its associated stationary section when vehicle cab door, disposed vertically above the fender, is closed even though the releasable lock device for connecting the fender sections together is released.

The foregoing and other important objects and desirable features inherent in and encompassed by the invention, together with many of the purposes and uses thereof, will become readily apparent from a reading of the ensuing description in conjunction with the annexed drawings, in which, Figure 1 is a side elevational view of a motor truck embodying the invention;

Figure 3 is an enlarged, fragmentary view of the releasable lock device for connecting the movable fender section to the stationary fender section.

Figure 4 is an end sectional view of the lock device taken substantially along line 4—4 of Figure 3;

Figure 5 is a plan sectional view taken substantially along line 5—5 of Figure 3;

Figure 6 is a detailed view of the detachable hinge structure for pivotally connecting the movable fender section to the radiator grille; and Figure 7 is a detailed view of the safety interlock mechanism.

Figure 1:
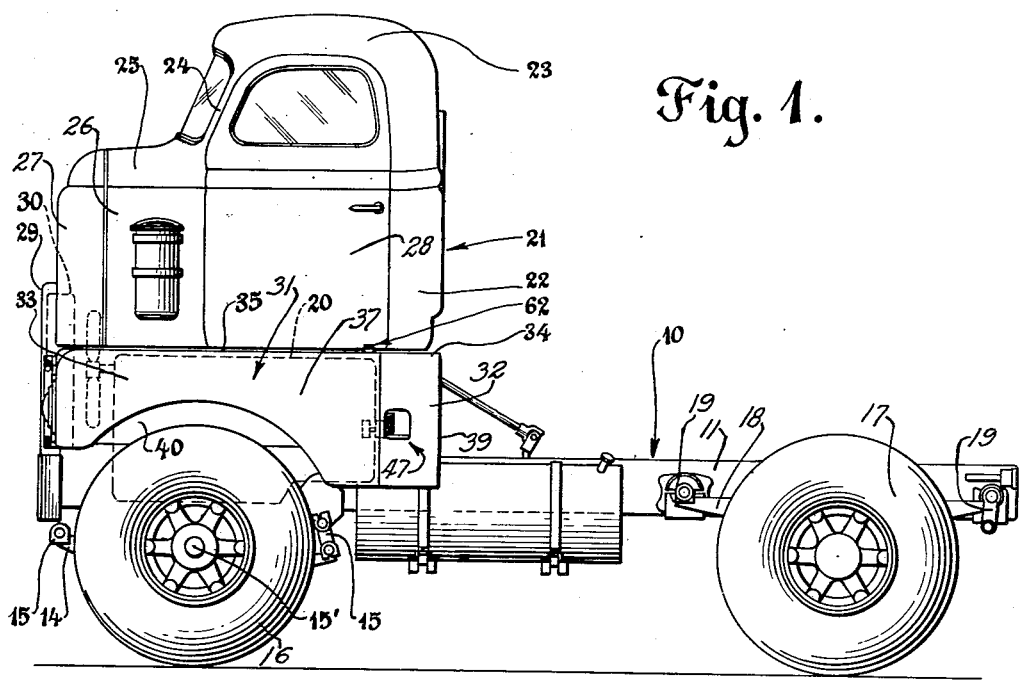
Figure 2:
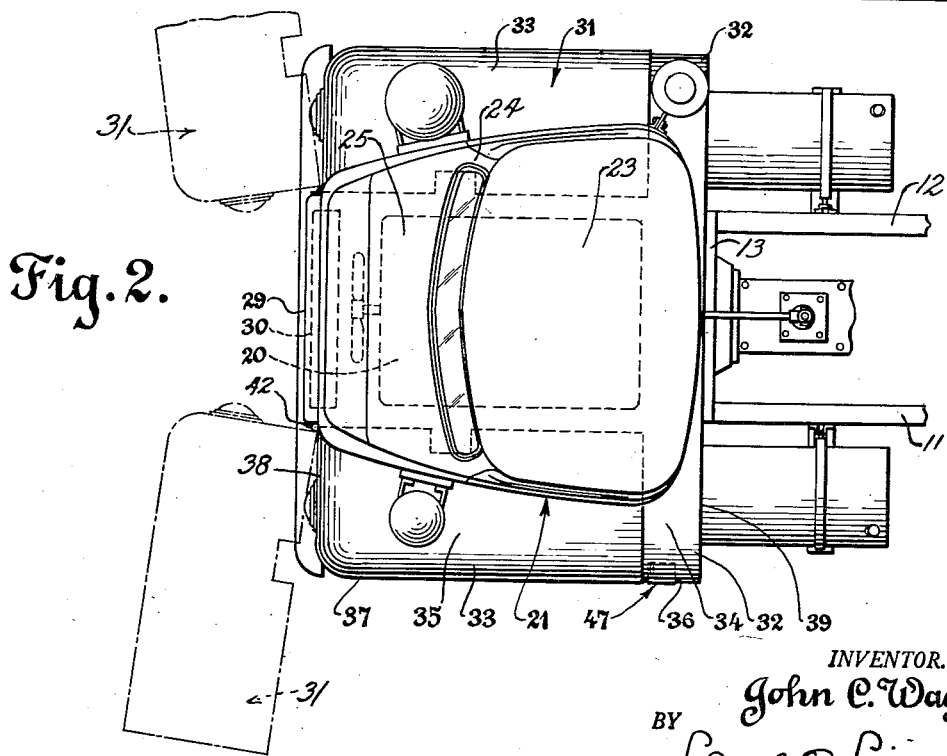
Figure 2 is a plan view of the motor truck shown in Figure 1; the dotted lines represent the open or swung position of the movable fender sections.

Referring to the drawings, wherein like reference characters designate like elements throughout the various views, there is shown a motor truck chassis frame 10 which includes a pair of transversely spaced, longitudinally extending channel-shaped side sill members 11 and 12. The side sill members 11, 12 are interconnected by a plurality of cross members 13 (one of which is shown in Figure 2). Springs 14, partially illustrated, are connected by shackle brackets 15 to the side sill members 11, 12. The springs 14 (only one is shown in Figure 1) are rigidly connected to an axle 15' on which steerable wheels 16 are rotatably mounted. In a similar manner drive wheels 17 are resiliently suspended from the side sill members 11 and 12 by means of springs 18 and shackle brackets 19. It is to be understood that any conventional structure could be substituted for the foregoing structure without departing from the spirit and scope of the invention.

The vehicle power plant or engine 20, shown diagrammatically in dotted outline in Figures 1 and 2, is mounted on the extreme forward end of the chassis frame 10. Supported over the power plant 20 is an operator's compartment, designated generally by numeral 21. The operator's compartment 21 includes a rear panel 22 joined to a roof 23 which in turn is connected to a windshield frame 24. The windshield frame 24 is integrally formed with an inverted U-shaped cowl panel 25. Secured to the cowl panel 25 are depending side panels 26 and a front panel 27. A pair of doors 28 are pivotally connected to the side panels 26, respectively. As best shown in Figures 1, 2, 6 and 7, a grille 29, which is supported by the chassis frame 10, encircles the radiator 30.

A vehicle fender 31, in the present invention, is disposed below the lower marginal edge of the operator's compartment 21 along each side thereof. Each fender 31 extends substantially from the vicinity of the rear panel 22 to the radiator grille 29 and includes a relatively short stationary section 32 rigidly connected to the chassis frame 10 and a movable section 33. It will be noted that the rear and movable sections 32 and 33 are formed with horizontal portions 34, 35, respectively, which extend transversely from the operator's compartment 21 and are in longitudinal alignment when the movable section 33 is in its normal position, as shown in Figures 1 and 2, covering a respective wheel 16. Depending from the horizontal portions 34, 35 are outboard, vertical portions 36, 37, respectively, which are rigidly secured thereto therewith. A front plate 38 is integrally formed with the depending portion 37 and is rigidly secured to the horizontal portion 35 by any suitable means. A similar rear plate 39 completes the rear fender section 32. Spaced inwardly from the depending portion 37 of each movable section 33 and fastened to the horizontal portion 35 is a shielding panel 40 which is adapted to substantially cover the area between the lower marginal edge of the operator's compartment 21 and the top surface of the side sill members 11 and 12 when the movable fender section 33 is in its normal, closed position to prevent dirt and other foreign elements from being thrown on the engine 20 by the wheels 16.

A piano-type hinge leaf 45, disposed vertically, is fastened to each movable section 33 at the forward end thereof by means of securing bolts 41. The hinge leaf 45 is adapted to be rotatably supported on a pintle 42 carried by a complementary hinge leaf 43. As best shown in Figures 6 and 7, hinge leaf 43 is provided with a pair of vertically spaced apertures 44 having vertical slots extending therefrom. A pair of threaded bolts 46, registerable with the apertures 44, are carried by the radiator grille 29 and have a head diameter less than the diameter of the apertures 44 but greater than the width of the slots. From the foregoing, it will be obvious that in order to assemble the movable section 33 on the motor truck the fender section 33 is positioned so that the bolts 46 extend through the apertures 44. The fender section 33 is then lowered vertically until the bolts 46 rest against the ends of the slots after which the bolts 46 are tightened to firmly clamp the hinge leaf 43 to the radiator grille 29. In order to remove the fender sections 33 bodily from the motor truck to gain full access to the sides of the engine 20 the above assembly steps are reversed.

A quick releasable lock device, designated generally by numeral 47 and shown in detail in Figures 3, 4 and 5, is provided for connecting the movable fender section 33 to the stationary section 32 whereby the fender sections are caused to engage each other in a snug, close-fitting relationship. The lock device 47 includes a latch bolt 48 rotatably and slidably journaled in a bearing bracket 49 fastened to the inner surface of the outboard portion 36 adjacent forward marginal edge thereof. A keeper 50 is secured to the movable section 33 adjacent the juncture of the rear and movable sections 32, 33 and is provided with a central aperture 51 registerable with the bearing bracket 49 when the fender sections are in their normal, longitudinally aligned positions. The latch bolt 48 includes a portion 52 which extends into an outwardly opening pocket 53 formed in the stationary section 32. A substantially V-shaped actuating handle 54, integrally-formed with the portion 52, is disposed within the pocket 53. The pocket 53 serves not only as an enclosure for the latch bolt actuating handle 54, but also as a step to facilitate entrance and exit to and from the operator's compartment 21 by the operator. A pin 55 is secured to the latch bolt portion 52 to provide radially extending projections 56. The projections 56 are slidable in a pair of axially extending, radially disposed open-end slots 57 formed in the bearing bracket 49. From the foregoing it will be appreciated that it is necessary to rotate the latch bolt 48 to align the projections 56 with the slots 57 before the latch bolt can be withdrawn out of engagement with the keeper 50. As best illustrated in Figure 4, a spring catch member 58, secured to the inner wall 59 of the pocket 53, frictionally engages the bight section 60 of the V-shaped handle 54 to yieldably lock the latch bolt 48 and prevent rotation of the same. It is to be understood that the projections 56 are out of alignment with the slots 57 when the catch member 58 is in engagement with the bight section 60. Thus, assuming that the fender sections 32, 33 are secured together, as shown in Figure 5, and it is desired to pivot the movable section 33 with respect to the rear section 32, the latch bolt 48 is first rotated to the dotted position shown in Figure 4 against the resilient action of the catch member 58. The projections 56, then being in alignment with the slots 57, are free to slide in the slots when the latch bolt 48 is moved axially out of engagement with the keeper 50. Secured to the forward marginal edge of the rear section 32 by any suitable means is a strip 61 of weather stripping material or the like which is overlapped by the rearwardmost edge of movable section 33 when the sections are in their normal position to mitigate the possibility of the sections rattling or squeaking during use of the motor truck.

While the releasable lock device 47 described above will generally suffice to maintain the movable section 33 connected to the stationary fender section 32 during operation of the motor truck, a safety interlock mechanism 62 is provided to positively prevent swinging of the movable section 33 away from the stationary section 32 if the lock device 47 should inadvertently become unlocked. The safety interlock 62 includes a metal strip 63 which is secured to the horizontal portion 35 of the movable sections 33. The metal strip 63 is bent to form a shoulder 64 which is engaged by the lower edge 65 of the door 28 when the door is in its closed position, as shown in Figure 7. It will be obvious that the movable fender section 33 cannot be swung away from the operator's compartment 21 when the shoulder 64 is confined between the lower edge 65 of the door 28 and the door sill 66 even though the lock device 47 associated therewith is released or unlocked.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a cab-over-engine type motor truck having a chassis frame, an engine compartment, a power plant, an operator's compartment mounted on said chassis frame above the truck power plant and having transversely aligned doorways including doors for entering and leaving said operator's compartment formed in the side walls thereof, each of said doors pivotally mounted adjacent a respective doorway and swingable between open and closed positions, the lower marginal edges of said doorways being defined by door sills, the lower marginal edge of each of said doors overlying and being transversely spaced from the door sill of its respective doorway when said door is in its closed position, and a vertically disposed radiator grille secured to and extending across said chassis frame, the combination comprising, a vehicle fender disposed below said operator's compartment on each side thereof normally extending substantially from the back wall of said operator's compartment to said radiator grille, said fender serving as portions of side walls of said engine compartment, each of said fenders including a stationary rear section and a movable front section normally in alignment with said rear section; means for pivotally connecting the forward end of each of said front sections to a respective side of said radiator grille for swinging movement about a vertical axis with respect to its associated rear section whereby said front sections may be swung outwardly about said vertical axes from their normally aligned positions to permit direct access to said power plant; and interlock means for maintaining each of said front fender sections in its normal, aligned position including first releasable lock means and second releasable lock means, said first lock means including a keeper fastened to said front section adjacent the juncture of said rear and front sections, said keeper having a central aperture formed therein, a supporting bracket attached to said rear section and having a cylindrically shaped bearing surface alignable with said aperture when said sections are in their normal position, a latch bolt supported by said bearing surface for reciprocating and rocking movement, said latch bolt being adapted to reciprocate between a locked position wherein said latch bolt extends into said aperture to lock said front section to said rear section and a retracted position wherein said latch bolt is withdrawn from said aperture to unlock said front and rear sections, and means carried by said latch bolt and said supporting bracket for preventing reciprocation of said latch bolt from said locked position to said retracted position until said latch bolt is initially rocked a predetermined number of degrees, said second lock means including said doors, and means carried by each of said front sections adapted to be confined between an associated door and door sill when said door is in its closed position and the respective front section is in its normal, aligned position for preventing outward swinging of said front section with respect to said rear section, said second lock means being released upon swinging of said operator's compartment doors to their open positions by ceasing the confined relationship of said means carried by said front sections between said doors and door sills.

2. The combination substantially as set forth in claim 1, in which, said means for preventing reciprocation of said latch bolt from said locked position to said retracted position until said latch bolt is initially rocked a predetermined number of degrees includes a pin carried by said latch bolt having portions projecting radially in opposite directions therefrom adapted to engage the end of said supporting bracket, said supporting bracket having a pair of axially extending, radially disposed open end slots formed therein for receiving said pin portions to allow reciprocation of said latch bolt to said retracted position.

3. The combination substantially as set forth in claim 2, in which, yieldable means carried by said rear fender section engageable with said latch bolt are provided for initially resisting rocking of said latch bolt said predetermined number of degrees to align said pin portions with said slots.

4. In a cab-over-engine type motor truck having a chassis frame, an engine compartment, a power plant enclosed by said engine compartment, an operator's compartment mounted on said chassis frame above its truck power plant and having transversely aligned doorways for entering and leaving the operator's compartment formed in the side walls thereof, the lower marginal edges of said doorways being defined by door sills, and a vertically disposed radiator grille secured to and extending across said chassis frame, the combination including, a vehicle fender disposed below said operator's compartment on each side thereof extending substantially from the back wall of said operator's compartment to said radiator grille and serving as side wall portions of said engine compartment, each of said fenders including a stationary rear section having a vertical wall and a front section having a vertical wall, said vertical walls being alignable so as to be disposed in the same plane, the forward end of said front sections being connected to a respective side of said radiator grille for povotal movement about a vertical axis, each of said front sections being capable of swinging horizontally about a respective vertical axis with respect to said radiator grille whereby the free end of said front section moves outwardly and forwardly from its associated rear section to permit direct access to said power plant; and means for maintaining each of said front sections in its normal position wherein the vertical wall of said front section is in alignment with the vertical wall of a respective rear section including first releasable lock means carried by said front and rear sections for connecting the free end of each of said front sections to a respective rear section, and second releasable lock means including an operator's compartment door pivotally mounted adjacent each doorway swingable about a vertical axis with respect to the operator's compartment between open and closed positions, the lower, substantially transversely aligned marginal edge of each of said doors and the lower marginal edge of its respective door sill being transversely spaced with respect to each other when said doors are in their closed positions, and means carried by said front sections and operatively engaged by said doors when in their closed positions for preventing outward swinging of said front sections including a generally upright member attached to each of said front sections and extending vertically above the lower marginal edges of a respective door and door sill adapted to be disposed and confined in the transverse space between an associated door and door sill when said vertical walls are aligned and the associated operator's compartment door is closed.

5. In a cab-over-engine type motor truck having an engine, an enclosure for said engine, and a vehicle cab having a doorway formed in the wall thereof for entering and leaving the vehicle cab, the lower marginal edge of said doorway being defined by a door sill, the combination including, a vehicle fender forming a side wall portion of said engine enclosure and comprising a stationary section and a movable section normally positioned in alignment with said stationary section, said movable section being pivotally supported by said motor truck for horizontal swinging movement with respect to said stationary section about a vertical axis spaced forwardly of said stationary section whereby outward horizontal swinging of said movable section with respect to said stationary section permits direct access to said engine; and lock means for maintaining said movable section in the normal, aligned position including a vehicle cab door pivotally mounted adjacent said doorway swingable between open and closed positions about an axis spaced from and substantially parallel to the pivotal axis of said movable fender section, the lower marginal edge of said door overlying and being transversely spaced from said door sill when said door is in its closed position, said movable fender section having a member fixed to and extending vertically from said movable fender section adjacent the free end thereof and disposed adjacent said door sill when said movable fender section is in its normal position, said member having a shoulder formed thereon adapted to be confined between the lower edge of said door and said door sill when said door is in its closed position and said movable fender section is in its normal position to prevent outward swinging of said movable section.

6. The combination substantially set forth in claim 5, in which, said lock means further includes a lock member carried by said stationary section adapted to releasably engage the free end of said movable section when said sections are in their normal, aligned positions.

References Cited in the file of this patent

UNITED STATES PATENTS

| 1,508,029 | Segal | Sept. 9, 1924 |
| 1,795,208 | Garner | Mar. 3, 1931 |
| 2,362,453 | Cosper | Nov. 14, 1944 |
| 2,413,792 | Sharp | Jan. 7, 1947 |
| 2,422,912 | Kling | June 24, 1947 |
| 2,447,898 | Colaner | Aug. 24, 1948 |
| 2,491,800 | Colaner | Dec. 20, 1949 |
| 2,699,223 | Brumbaugh | Jan. 11, 1955 |

FOREIGN PATENTS

| 135,726 | Austria | Dec. 11, 1933 |

OTHER REFERENCES

Publication: "Commercial Car Journal," vol. 79, issue No. 4, pgs. 78 and 214, publication date June 1950.